United States Patent
Hirano

(10) Patent No.: US 8,276,971 B2
(45) Date of Patent: Oct. 2, 2012

(54) AERODYNAMIC STRUCTURE FOR VEHICLE

(75) Inventor: Munehiro Hirano, Aichi (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 182 days.

(21) Appl. No.: 12/678,319

(22) PCT Filed: Aug. 18, 2008

(86) PCT No.: PCT/JP2008/064689
§ 371 (c)(1),
(2), (4) Date: Mar. 16, 2010

(87) PCT Pub. No.: WO2009/037935
PCT Pub. Date: Mar. 26, 2009

(65) Prior Publication Data
US 2010/0213737 A1 Aug. 26, 2010

(30) Foreign Application Priority Data
Sep. 19, 2007 (JP) .................................. 2007-242779

(51) Int. Cl.
*B62D 35/00* (2006.01)
*B62D 25/18* (2006.01)
(52) U.S. Cl. ...................... 296/180.1; 280/851; 280/159; 180/903
(58) Field of Classification Search .................. 280/851, 280/159; 296/180.1–180.4; 180/903
See application file for complete search history.

(56) References Cited

U.S. PATENT DOCUMENTS
2003/0098576 A1* 5/2003 Brulhart ......................... 280/848

FOREIGN PATENT DOCUMENTS
| DE | 197 18 946 | 11/1998 |
| EP | 2 006 194 | 12/2008 |
| GB | 2 265 875 A | 10/1993 |
| JP | 8-216929 | 8/1996 |
| JP | 2003-528772 | 9/2003 |
| WO | WO 90/02073 | 3/1990 |

OTHER PUBLICATIONS

Extended European Search Report for EP Appl. No. 08831472.9-1268 dated Mar. 8, 2011.
K. Sumitani et al., U.S. Appl. No. 12/293,659, filed Sep. 19, 2008.

* cited by examiner

*Primary Examiner* — Dennis Pedder
(74) *Attorney, Agent, or Firm* — Finnegan, Henderson, Farabow, Garrett & Dunner, LLP

(57) ABSTRACT

An aerodynamic structure for a vehicle that can effectively adjust airflow within a wheel house is provided.
An aerodynamic structure (10) for a vehicle has an airflow collision wall (24) provided rearward, in a vehicle body longitudinal direction, with respect to a front wheel (15) in a wheel house (14), and extending in a vehicle width direction and facing a lower side in a vehicle body vertical direction, and an airflow guiding wall (22) hanging downward in the vehicle body vertical direction from a rear end portion (24A) in the vehicle body longitudinal direction of the airflow collision wall (24). The airflow guiding wall (22) extends in the vehicle body vertical direction, or extends in a tilting direction directed both toward the front wheel (15) side and toward the lower side in the vehicle body vertical direction.

3 Claims, 6 Drawing Sheets

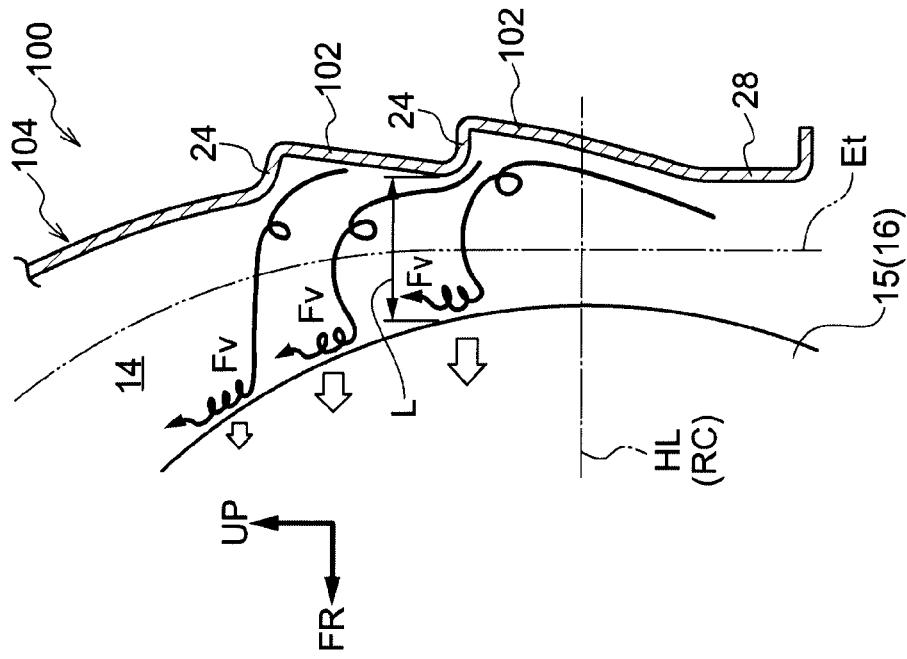
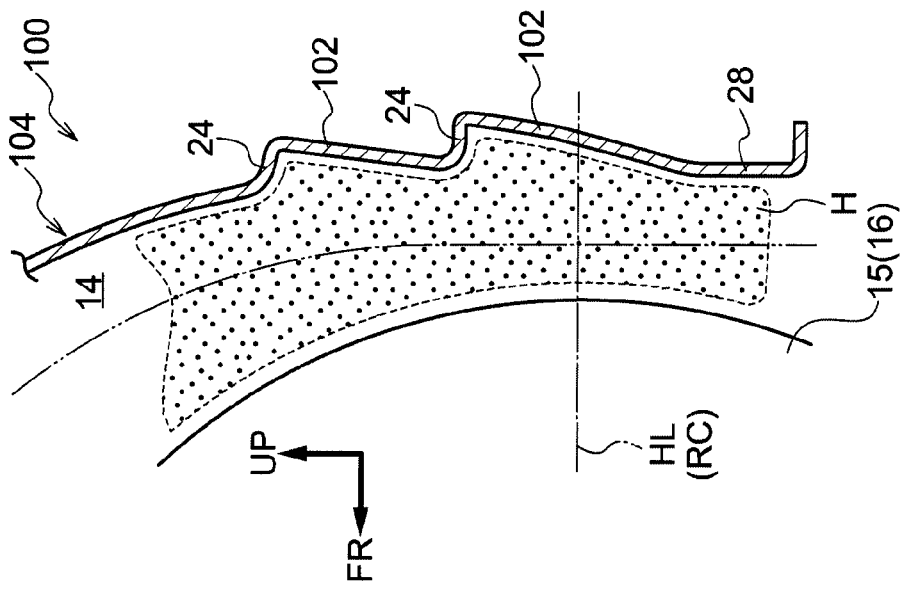

US 8,276,971 B2

AERODYNAMIC STRUCTURE FOR VEHICLE

CROSS-REFERENCE TO RELATED APPLICATIONS

This application is a national phase application of International Application No. PCT/JP2008/064689, filed Aug. 18, 2008, and claims the priority of Japanese Application No. 2007-242779, filed Sep. 19, 2007, the contents of both of which are incorporated herein by reference.

TECHNICAL FIELD

The present invention relates to an aerodynamic structure for a vehicle for adjusting airflow within a wheel house.

BACKGROUND TECHNOLOGY

There is known an aerodynamic stabilizer that is structured by fixing a baffle to the front side or the vehicle width direction inner side of a wheel within a wheel house of an automobile (see, for example, Japanese National Publication No. 2003-528772). Further, the technology disclosed in the specification of British Patent Application Publication No. 2265785 is known.

DISCLOSURE OF THE INVENTION

Problems to be Solved by the Invention

However, in the conventional technique as described above, because the baffle projects-out from the wheel house, there are various limitations such as avoiding interference with the wheel and the like, and it is difficult to obtain a sufficient airflow adjusting effect.

In view of the above-described circumstances, an object of the present invention is to provide an aerodynamic structure for a vehicle that can effectively adjust airflow within a wheel house.

Means for Solving the Problems

An aerodynamic structure for a vehicle relating to a first aspect of the present invention comprises: an airflow collision wall provided at a front or a rear in a vehicle body longitudinal direction with respect to a wheel in a wheel house, and extending in a vehicle width direction and facing a lower side in a vehicle body vertical direction; and an airflow guiding wall extending toward the lower side in the vehicle body vertical direction from an end portion of the airflow collision wall which end portion is at a side that is far from the wheel, wherein the airflow guiding wall extends in the vehicle body vertical direction, or extends so as to be directed both toward the wheel and toward the lower side in the vehicle body vertical direction.

In accordance with this aspect, accompanying traveling, airflow hits the front surface of the wheel, and airflow directed toward the rear (the upstream side in the wheel rotating direction) arises within the wheel house. Further, accompanying traveling of the vehicle (rotation of the wheel), airflow, that is dragged-in by rotation of the wheel and is directed toward the front (the downstream side in the wheel rotating direction) arises within the wheel house.

In a structure in which the airflow collision wall is provided further toward the rear side in the vehicle body longitudinal direction than the rotational center of the wheel, a portion of the airflow that is directed toward the front within the wheel house is guided by the airflow guiding wall and collides with the airflow collision wall. Due thereto, pressure rises around the concave (groove) portion that is formed by the airflow collision wall and the airflow guiding wall, and flowing-in of air to the wheel house is suppressed. Further, because the airflow collision wall is positioned further rearward than the rotational center of the wheel, flowing-in of air to the wheel house accompanying rotation of the wheel is suppressed at the upstream (entrance) side, and discharging of air, that has flowed-into the wheel house, from the side is suppressed.

On the other hand, in a structure in which the airflow collision wall is provided further toward the front side in the vehicle body longitudinal direction than the rotational center of the wheel, the airflow that is directed toward the rear within the wheel house is guided by the airflow guiding wall and is blocked by the airflow collision wall, and the flowing of airflow toward the rear within the wheel house is suppressed. Due thereto, interference of the airflow, that is directed toward the rear within the wheel house, and the airflow, that is directed toward the front, is suppressed, and these flows are smoothly discharged to the side of the wheel. Namely, the airflow around the wheel is adjusted.

In this way, in the present aerodynamic structure for a vehicle, airflow can be effectively adjusted within a wheel house.

By the way, in the present aerodynamic structure for a vehicle, even in structures in which the airflow collision wall is provided at either the front or rear in the vehicle body longitudinal direction with respect to the wheel, there are cases in which adhered matter such as snow or ice or the like adheres between the wheel house inner surface and the wheel.

Here, in the present aerodynamic structure for a vehicle, because the airflow guiding wall extends in the vehicle body vertical direction, or extends so as to be directed (e.g., inclined) both toward the wheel side and toward the lower side in the vehicle body vertical direction, the airflow guiding wall does not form a negative angle at the wheel house inner surface side with respect to the vertical (vehicle body vertical) direction. Namely, in the present aerodynamic structure for a vehicle, there is no shape that receives (catches), from the lower side in the vehicle body vertical direction, adhered manner such as snow or ice or the like, and the adhered matter easily drops-down. Note that, in a structure in which plural airflow guiding walls are provided, it is desirable that all of the plural airflow guiding walls extend in the vehicle body vertical direction, or extend so as to be directed both toward the wheel side and toward the lower side in the vehicle body vertical direction.

In the aerodynamic structure for a vehicle of the above-described aspect, the airflow collision wall and the airflow guiding wall are formed at a covering member that is formed in an arc shape opening downward in the vehicle body vertical direction in side view and that covers the wheel from an upper side in the vehicle body vertical direction.

In accordance with this aspect, the airflow collision wall and the airflow guiding wall of the above-described structures are formed at the covering member. Therefore, for example, by making the mold releasing direction at the time of forming the covering member coincide with the vertical direction in the state of being set in the vehicle, a molded structure at which negative angles (undercutting) are not formed can be made.

In the aerodynamic structure for a vehicle of the above-described aspect, the airflow collision wall and the airflow guiding wall are disposed at an upper side in the vehicle body vertical direction with respect to a rotational center of the wheel.

In accordance with this aspect, because the airflow collision wall and the airflow guiding wall (in a structure provided with combinations of plural airflow collision walls and airflow guiding walls, the combination that is positioned the furthest downward in the vehicle body vertical direction) are positioned at the upper side in the vehicle body vertical direction with respect to the rotational center of the wheel, the airflow collision wall is positioned so as to be apart, at the upper side in the vehicle body vertical direction, with respect to the rotational center of the wheel. Therefore, the distance, along the vehicle body longitudinal direction between the circular wheel outer surface and the airflow collision wall, is large, and the applying of air force to the wheel, that accompanies blocking of the airflow, is suppressed.

EFFECTS OF THE INVENTION

As described above, the aerodynamic structure for a vehicle relating to the present invention has the excellent effect of being able to effectively adjust airflow within a wheel house.

BRIEF DESCRIPTION OF THE DRAWINGS

FIG. 6A is a side sectional view schematically showing an adhered state of ice/snow at an aerodynamic structure for a vehicle relating to a comparative example with the embodiment of the present invention.

FIG. 6B is a side sectional view schematically showing airflow at the aerodynamic structure for a vehicle relating to the comparative example with the embodiment of the present invention.

PREFERRED FORMS FOR EMBODYING THE INVENTION

An aerodynamic structure 10 for a vehicle relating to an embodiment of the present invention will be described on the basis of FIG. 1 through FIG. 4. Note that arrow FR, arrow UP, arrow IN and arrow OUT that are written appropriately in the respective drawings respectively indicate the forward direction (direction of advancing), the upward direction, the vehicle width direction inner side and the outer side of an automobile S to which the aerodynamic structure 10 for a vehicle is applied. Hereinafter, when merely the top, bottom, front, back and the inner and outer sides in the vehicle width direction are indicated, they correspond to the directions of the aforementioned respective arrows. Further, in this embodiment, the aerodynamic structure 10 for a vehicle is applied respectively to left and right front wheels 15, rear wheels 16 that serve as wheels, but because the respective aerodynamic structures 10 for a vehicle are basically structured similarly (symmetrically in the case of the left and the right), hereinafter, mainly one of the left and right aerodynamic structures 10 for a vehicle for the front wheels will be described.

Figure 1:
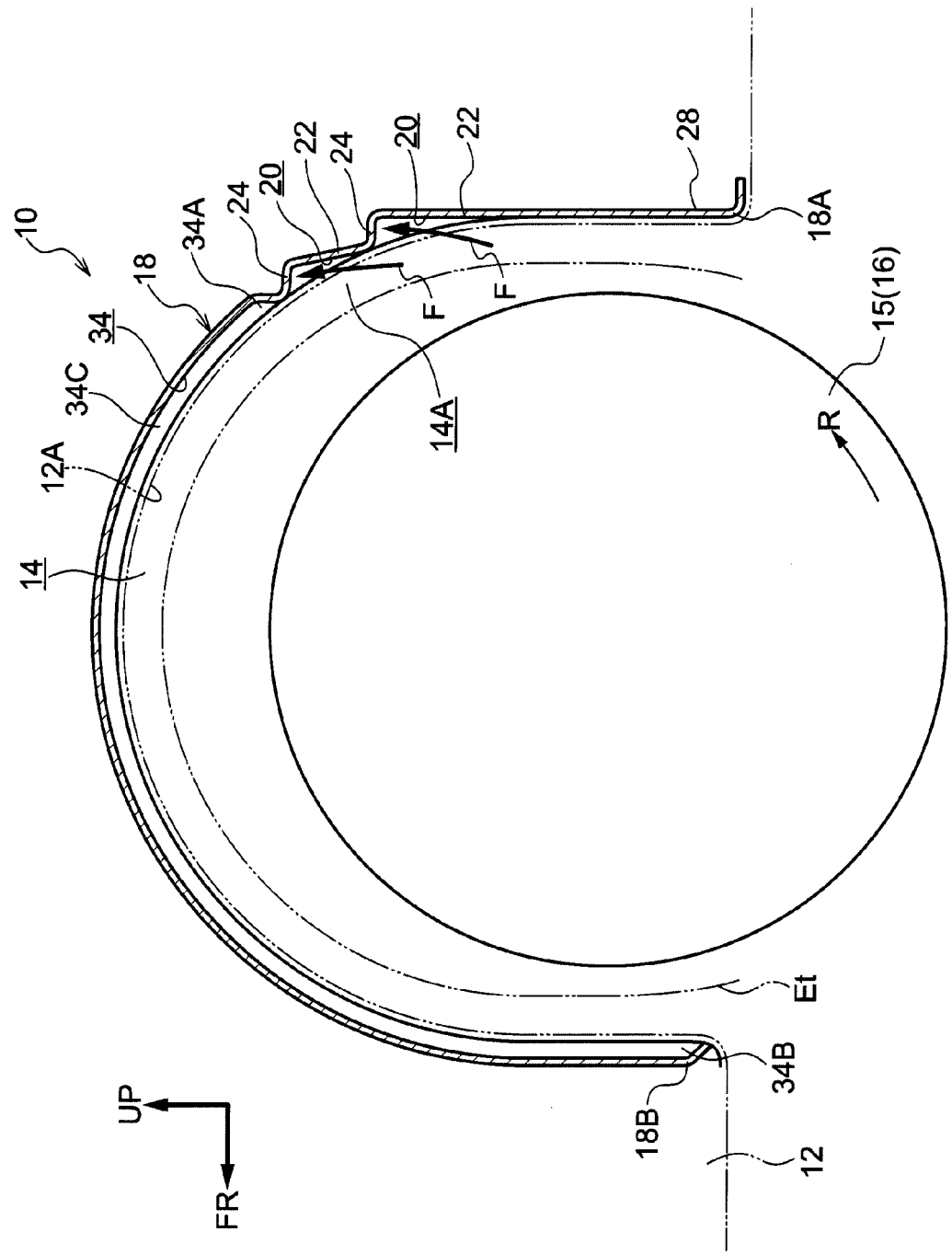
FIG. 1 is a side sectional view schematically showing the schematic overall structure of an aerodynamic structure for a vehicle relating to an embodiment of the present invention.
Figure 2:
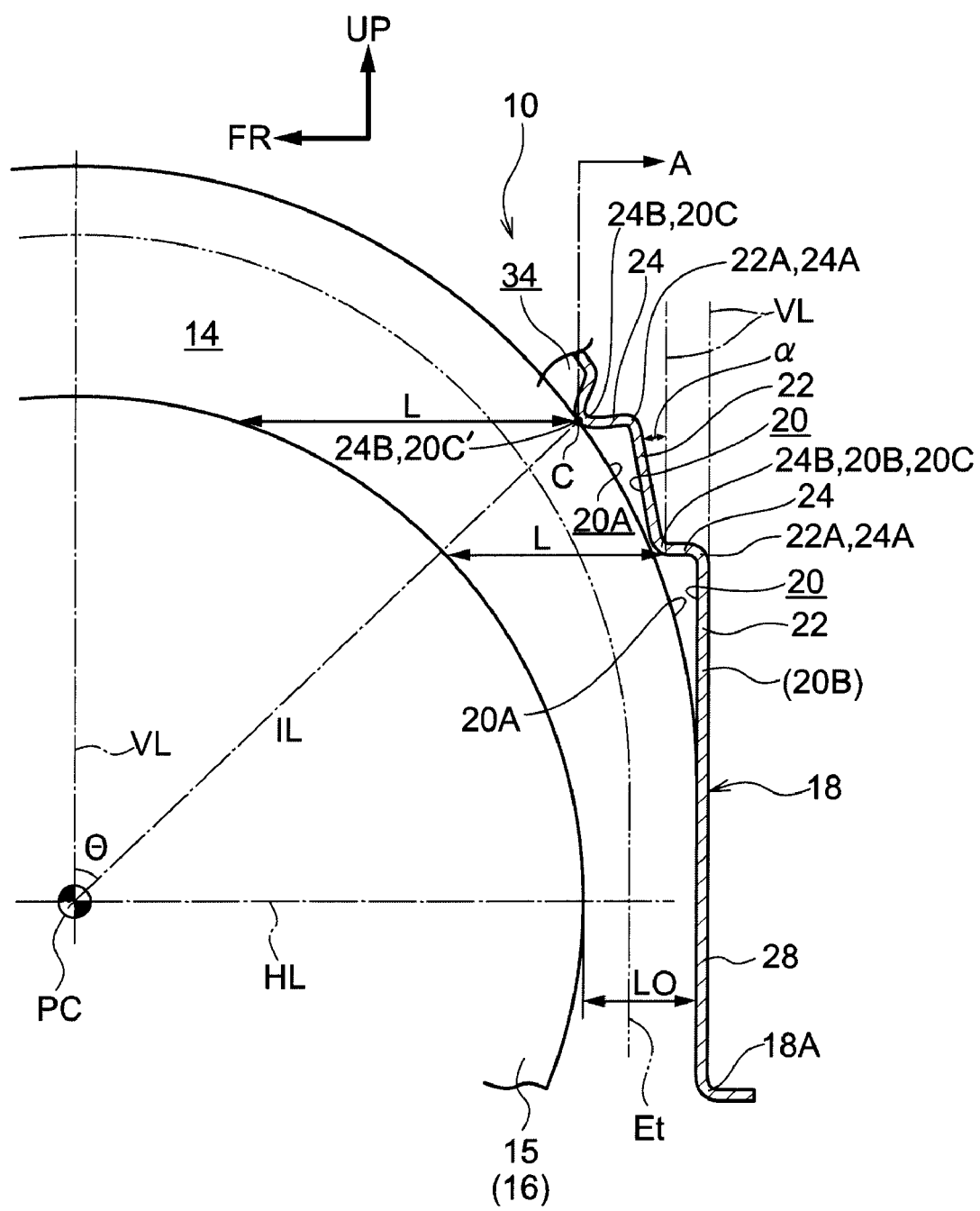
FIG. 2 is a side sectional view showing, in an enlarged manner, main portions of the aerodynamic structure for a vehicle relating to the embodiment of the present invention.
Figure 3:
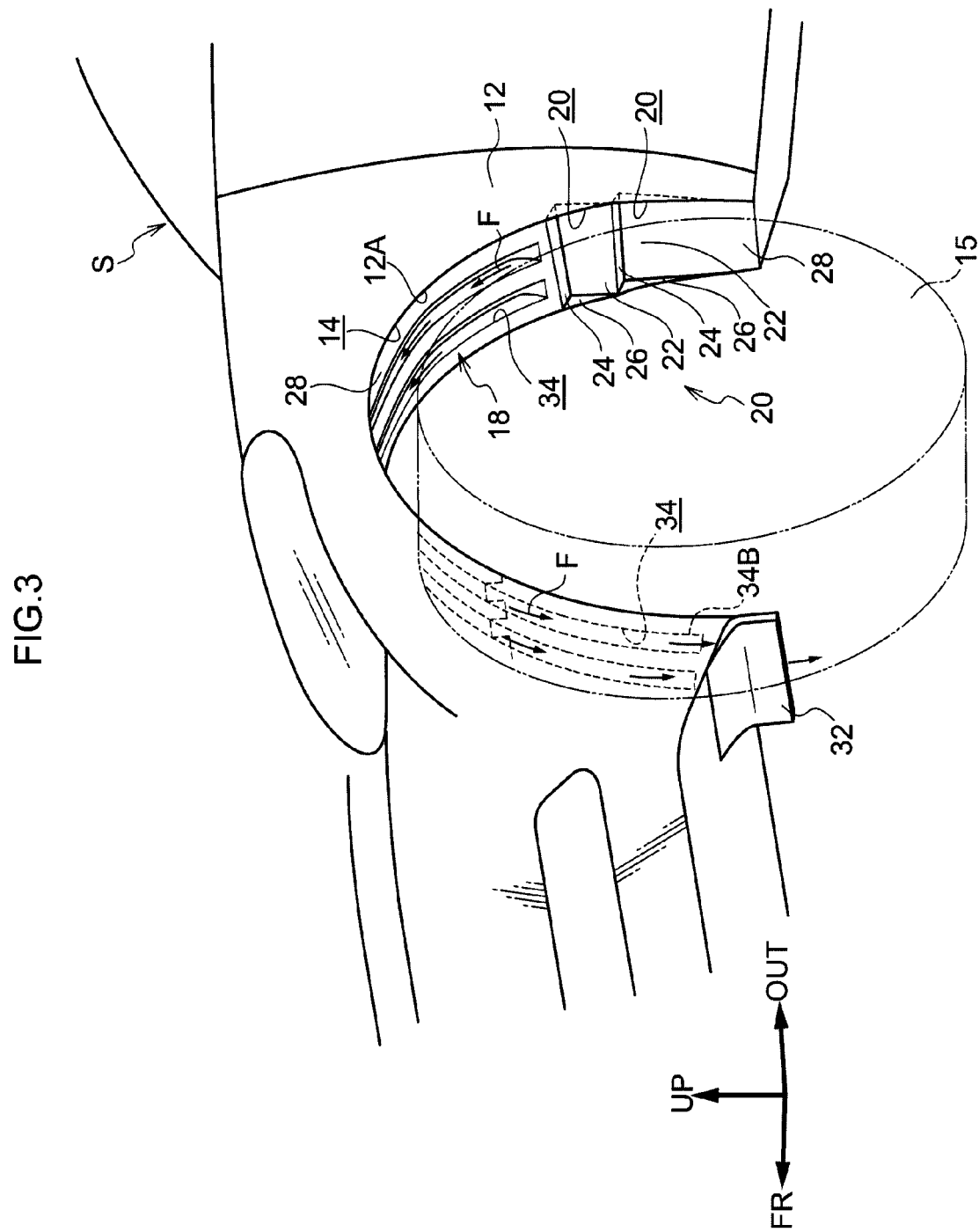
FIG. 3 is a perspective view showing a front portion of an automobile to which the aerodynamic structure for a vehicle relating to the embodiment of the present invention is applied.

The schematic overall structure of the aerodynamic structure 10 for a vehicle is shown in FIG. 1 in a schematic side sectional view. Further, main portions of the aerodynamic structure 10 for a vehicle are shown in FIG. 2 in an enlarged side sectional view. The front portion of the automobile S, to which the aerodynamic structure 10 for a vehicle is applied, is shown in FIG. 3 in a schematic perspective view. As shown in FIG. 1 and FIG. 3, the automobile S has a front fender panel 12 that structures the vehicle body thereof. A wheel arch 12A, that is formed in the shape of a substantially semicircular arc that opens downward in side view for allowing steering of the front wheel 15, is formed in the front fender panel 12. Although not illustrated, a fender apron is joined to the inner side of the front fender panel 12, and a wheel house inner is provided at the fender apron. Due thereto, a wheel house 14, that is disposed such that the front wheel 15 can steer, is formed at the front portion of the automobile S.

Further, a fender liner 18 serving as a covering member, that is formed in a substantially circular arc shape that corresponds to the wheel arch 12A in side view and has a slightly larger diameter than the wheel arch 12A in side view and is formed in a substantially rectangular shape that covers and hides the front wheel 15 in plan view, is disposed at the inner side of the wheel house 14. Accordingly, the fender liner 18 is accommodated within the wheel house 14 so as to not be exposed from the wheel arch 12A in side view. The fender liner 18 covers the substantially upper half portion of the front wheel 15 from the front, above and the rear, and prevents mud, small stones, and the like from hitting the fender apron (the wheel house inner) and the like. The fender liner 18 is made of a resin formed by, for example, resin molding (injection molding or vacuum molding), or is a structure in which a nonwoven fabric is used as the substrate or as the surface material.

Further, the fender liner 18 structuring the aerodynamic structure 10 for a vehicle has concave portions (groove portions) 20 that open to the front wheel 15 side as seen in side view. In this embodiment, the concave portions 20 are provided at a portion of the fender liner 18 which portion is positioned at the rear side of the front wheel 15 (a portion that overlaps the front wheel 15 in the vehicle body vertical direction). In this embodiment, as shown in FIG. 2, the concave portions 20 are provided within a region A that is further rearward and downward than a portion C that is intersected by an imaginary straight line IL that forms an angle θ (θ<90° with a horizontal line HL that passes through a rotational axis RC of the front wheel 15, of the portion of the fender liner 18 which portion is further toward the rear than the rotational axis RC (wheel center) of the front wheel 15. The region A, where the concave portions 20 are to be set, will be described later.

As shown in FIG. 2, the concave portion 20 opens toward the front wheel 15 side as described above, and forms a substantially triangular shape as seen in side view whose width along the peripheral direction of the fender liner 18 (the wheel house 14) becomes a maximum at the opening portion 20A. More specifically, the concave portion 20 is structured to have an airflow guiding wall 22, that extends substantially upward from a lower edge 20B of the opening portion 20A, and an airflow collision wall 24, that extends from a rear upper end 22A of the airflow guiding wall 22 toward an upper edge 20C of the opening portion 20A.

The length of the side surface (the length of a side of the triangle) of the airflow collision wall 24 is made to be small with respect to the airflow guiding wall 22. Due thereto, as shown in FIG. 1, the airflow guiding wall 22 extends in a direction substantially along airflow F so as to guide the airflow F (the airflow substantially along a tangent direction of the front wheel 15), that arises accompanying rotation of the front wheel 15 (rotation in the direction of arrow R that is the direction of causing the automobile S to advance forward), to within the concave portion 20. On the other hand, the airflow collision wall 24 extends so as to face the airflow F, and the airflow F that flows-into the concave portion 20 collides therewith.

Due to the above, at the aerodynamic structure 10 for a vehicle, there is a structure in which a portion of the airflow F is blocked by the concave portion 20 and the pressure within the concave portion 20 rises, and accompanying this, the pressure between the opening portion 20A of the concave portion 20 and the front wheel 15 rises. Due to this rise in pressure, at the aerodynamic structure 10 for a vehicle, flowing-in of the airflow F into the wheel house 14 is suppressed.

Further, as shown in FIGS. 1 through 3, the plural (two in this embodiment) concave portions 20 are provided at the fender liner 18, so as to be parallel in the peripheral direction of the fender liner 18. In this embodiment, as shown in FIG. 2, the lower edges 20B, the upper edges 20C of the opening portions 20A of the concave portions 20, that are adjacent in the peripheral direction of the fender liner 18, substantially coincide. Namely, the plural concave portions 20 are formed so as to form indentations and protrusions (wave shapes), that are triangular in sectional view, continuously in the peripheral direction of the fender liner 18.

Further, as shown in FIG. 3, the respective concave portions 20 extend along the vehicle width direction, and the vehicle width direction outer ends thereof are sealed by a side wall 26. On the other hand, the vehicle width direction inner ends of the respective concave portions 20 may be open inwardly in the vehicle width direction, or may be sealed by a side wall that faces the side wall 26. Note that, although not illustrated, in this embodiment, the concave portions 20 are formed so as to overlap over the entire width in the vehicle width direction with respect to the front wheel 15 that is positioned at a neutral position (is in a straight traveling posture).

As shown in FIG. 1, the fender liner 18 is structured such that, mainly at a general wall portion 28 and the lower edges 20B, the upper edges 20C of the concave portions 20, the distance to a tire envelope Et of the front wheel 15 is greater than or equal to a predetermined value. The tire envelope Et shows the locus of the most outer side (side near the vehicle body) among the loci of the entire relative displacements with respect to the vehicle body including the steering and bouncing of the front wheel 15.

Further, as shown in FIG. 1 and FIG. 3, the aerodynamic structure 10 for a vehicle is provided with guide grooves 34 that serve as peripheral direction grooves provided in the fender liner 18 so as to open toward the front wheel 15 side. Portions of the guide grooves 34 that are further toward the vehicle body longitudinal direction front side than the (concave portion 20 that is positioned the most upward and forward of the) concave portions 20 are proximal ends 34A, and the longitudinal directions of the guide grooves 34 are along the peripheral direction of the fender liner 18, and the portions of the guide grooves 34 that are in a vicinity of a front lower end portion 18B of the fender liner 18 are final ends 34B. The guide grooves 34 do not communicate with the concave portions 20.

The groove floors of the guide grooves 34 at the proximal ends 34A and the final ends 34B are respectively tapered, and smoothly continue with the general wall portion 28 (the open surfaces of the concave portions 20 and the guide grooves 34) that forms the general surface of the fender liner 18, and the airflow along the peripheral direction of the concave portions 20 (the wheel house 14) smoothly enters therein and exits therefrom. As shown in FIG. 1, in this embodiment, the plural (two) guide grooves 34 that are parallel in the vehicle width direction are provided. These guide grooves 34 are structured so as to guide the airflow, that is directed from the rear toward the front along the inner periphery of the fender liner 18, so as to make the airflow flow-in from the proximal ends 34A and be discharged from the final ends 34B. In other words, a pair of walls 34C, that face the vehicle width direction at the respective guide grooves 34, are structured so as to prevent airflow directed in the vehicle width direction from arising. Note that the above shows an example in which two of the guide grooves 34 are provided, but merely one guide groove 34 may be provided or three or more may be provided.

Further, as shown in FIG. 1 and FIG. 2, at the aerodynamic structure 10 for a vehicle, the airflow collision walls 24 of the respective concave portions 20 respectively are disposed at the upper side in the vehicle body vertical direction, with respect to the horizontal line HL that passes through the rotation axis RC in the standard traveling state of the front wheel 15. More concretely, at the aerodynamic structure 10 for a vehicle, the airflow collision walls 24 of the respective concave portions 20 are disposed at positions in the vehicle body vertical direction at the fender liner 18 at which the general wall portion 28 forms a substantial arc shape in side view, such that rear end portions 24A in the vehicle body longitudinal direction of the respective airflow collision walls 24 (the rear upper ends 22A of the airflow guiding walls 22) are positioned at the front side in the vehicle body longitudinal direction or positions thereof in the vehicle body longitudinal direction coincide, with respect to a rear lower end portion 18A at the fender liner 18 inner surface.

Moreover, at the aerodynamic structure 10 for a vehicle, the rear end portion 24A in the vehicle body longitudinal direction of the airflow collision wall 24, that is positioned relatively at the upper side in the vehicle body vertical direction, is positioned at the front side in the vehicle body longitudinal direction or the position thereof in the vehicle body longitudinal direction coincides, with respect to a front end portion 24B in the vehicle body longitudinal direction of the airflow collision wall 24 that is positioned at the lower side. In other words, the recessed amount of the concave portion 20 from the general wall portion 28, i.e., a height h (see FIG. 2) of the airflow collision wall 24, and the range of setting the concave portions 20 (the aforementioned region A) are set so as to satisfy this condition.

For these reasons, at the aerodynamic structure 10 for a vehicle, the respective airflow guiding walls 22 are structured so as to extend in the vehicle body vertical direction, or so as to extend in an inclined direction that is directed both toward the front wheel 15 side and toward the lower side in the vehicle body vertical direction (a forward-tilting posture). In this embodiment, as shown in FIG. 2, the airflow guiding wall 22 that structures the lower side concave portion 20 extends substantially along a vertical line VL that runs along the vehicle body vertical direction, and the airflow guiding wall 22 that structures the upper side concave portion 20 extends in a direction that is tilted (including curving) by a predetermined angle α with respect to the vertical line VL. The angle α shown in FIG. 2 is α≧0in a case in which the direction in which the airflow guiding wall 22 tilts forward with respect to the vertical line VL is positive.

Moreover, at the aerodynamic structure 10 for a vehicle, because the angle, with respect to the vertical line VL of the airflow guiding wall 22 that is formed at the fender liner 18 that forms a substantial arc shape in side view, is as described above, the airflow collision wall 24 of the lower side concave portion 20 is disposed so as to be apart, upwardly in the vehicle body vertical direction, with respect to the horizontal line HL that passes through the rotation axis RC (the rotation axis RC in the standard traveling state, the same holds hereinafter) of the front wheel 15. Therefore, at the aerodynamic structure 10 for a vehicle, a distance L, that runs along the vehicle body longitudinal direction from the front end portion 24B in the vehicle body longitudinal direction of the airflow collision wall 24 to the surface of the circular front wheel 15, is disposed so as to be long as compared with a shortest distance L0 that runs along the vehicle body longitudinal direction between the fender liner 18 and the front wheel 15.

Still further, at the aerodynamic structure 10 for a vehicle, the general wall portion 28 extends substantially along the vehicle body vertical direction from the airflow guiding wall 22 that structures the lower side concave portion 20. Here, the border of the airflow guiding wall 22 and the general wall portion 28, that both extend substantially along the vehicle body vertical direction (the vertical line VL), is not clear in terms of function. However, with regard to the lower end of the airflow guiding wall 22, it can be understood as being a vicinity of a position where the length from the upper end is a length of the same extent as the length of the airflow guiding wall 22 that structures the upper side concave portion 20, or a vicinity of a lower limit position of the range of setting the side wall 26 at which the pressure raising effect of the concave portion 20 is high, or the like.

In this embodiment, no matter which of the above-described structures the lower end of the airflow guiding wall 22, that structures the lower side concave portion 20, is understood as being, it is understood as being positioned further toward the upper side in the vehicle body vertical direction than the horizontal line HL that passes through the rotation axis RC of the front wheel 15 in the standard traveling state. In other words, in this embodiment, all of the plural concave portions are understood as being positioned further toward the upper side in the vehicle body vertical direction than the horizontal line HL that passes through the rotation axis RC of the front wheel 15 in the standard traveling state.

As described above, the region A (range) where the concave portions 20 are set is the region at which 0°<θ<90°, when expressed by the angle θ shown in FIG. 2. At the upper limit side of the range of setting the concave portions 20, this angle θ is desirably made to be less than or equal to 50°, and at the lower limit side of the range of setting the concave portions 20, this angle θ is desirably made to be greater than or equal to 5°.

Figure 4A:
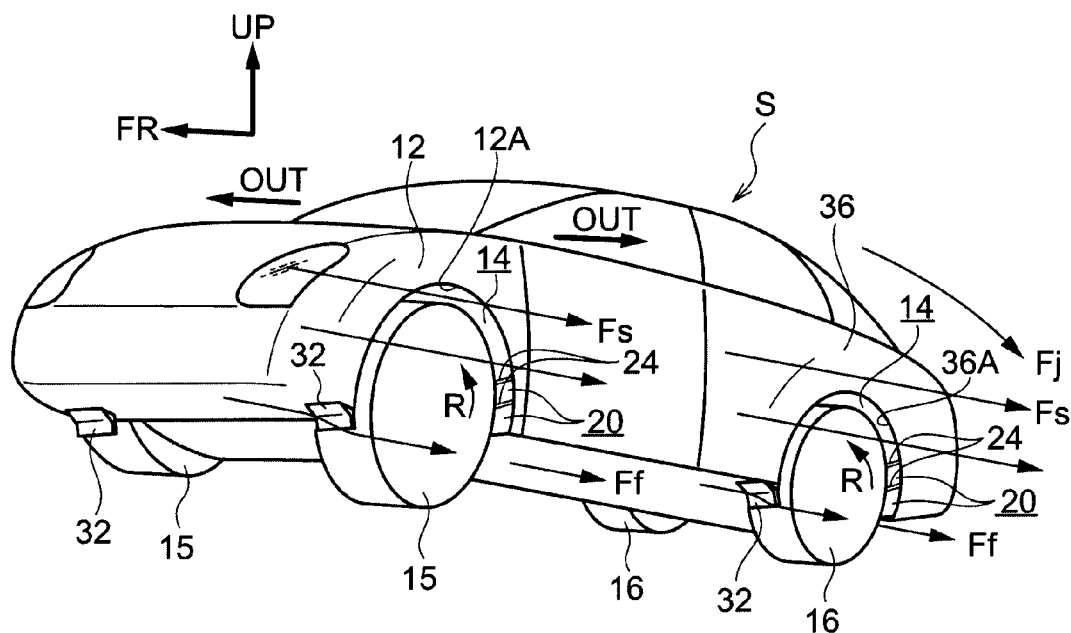
FIG. 4A is a perspective view of the automobile to which the aerodynamic structure for a vehicle relating to the embodiment of the present invention is applied.

Further, to supplement description of the aerodynamic structure 10 for a vehicle for the rear wheel 16, as shown in FIG. 4A, at the automobile S, the wheel house 14 is formed at the inner side of a wheel arch 36A of a rear fender panel 36, and the rear wheel 16 is disposed within the wheel house 14. The aerodynamic structure 10 for a vehicle for the rear wheel 16 is basically formed similarly to the aerodynamic structure 10 for a vehicle for the front wheel 15, except that the tire envelope Et of the rear wheel 16 that is not the steering wheel (or at which the steering angle is small) is different from the tire envelope Et of the front wheel 15 that is the steering wheel. Namely, the aerodynamic structure 10 for a vehicle for the rear wheel 16 is structured by forming the concave portions 20, the guide grooves 34 at a rear wheel house liner that covers the rear wheel 16 (in the following description, this liner will be called the fender liner 18, without being differentiated from that for the front wheel 15).

Note that, in this embodiment, the fender liner 18, that structures the aerodynamic structure 10 for a vehicle for the front wheel 15, is formed by vacuum molding or injection molding a resin. Further, the fender liner 18 (rear wheel house liner), that structures the aerodynamic structure 10 for a vehicle for the rear wheel 16, is formed by injection molding or vacuum molding a resin, or by molding by a die with a nonwoven fabric used as the substrate or as the surface material.

Further, as shown in FIG. 3, the aerodynamic structures 10 for a vehicle are provided with spats 32 that extend in the vehicle width direction and are disposed respectively at the front sides of the front wheels 15 and the rear wheels 16. The spats 32 are structured so as to prevent traveling wind, that accompanies traveling of the automobile S, from flowing into the wheel houses 14. The aerodynamic structure 10 for a vehicle may be a structure that is not provided with the spats 32.

Operation of the present embodiment will be described next.

At the automobile S to which the aerodynamic structure 10 for a vehicle of the above-described structure is applied, when the front wheel 15 rotates in the direction of arrow R accompanying the traveling of the automobile S, the airflow F, that is dragged in by this rotation of the front wheel 15 and flows-in substantially upward into the wheel house 14 from the rear of the front wheel 15, is generated. A portion of this airflow F is guided by the airflow guiding walls 22 and flows-into the concave portions 20, and collides with the airflow collision walls 24. Therefore, a portion of the airflow F is blocked, the pressure within the concave portions 20 rises, and the range of this rise in pressure extends to the space between the concave portions 20 and the front wheel 15. Due thereto, at the aerodynamic structure 10 for a vehicle, the flow-in resistance of air into the wheel house 14 from the rear of the front wheel 15 increases, and the flowing-in of air into that wheel house 14 is suppressed.

Similarly, at the automobile S to which the aerodynamic structure 10 for a vehicle is applied, due to the rise in pressure around the concave portions 20 that arises due to a portion of the airflow being blocked by the airflow collision walls 24 due to rotation of the rear wheel 16, the flow-in resistance of air into the wheel house 14 increases, and the flowing-in of air into that wheel house 14 is suppressed.

Further, another portion of the airflow F passes the setting region of the concave portions 20 and flows into the wheel house 14. At least a portion of the airflow F attempts to flow at the outer peripheral side due to centrifugal force and flows-into the guide grooves 34, and is guided by the guide grooves 34 and discharged from the final end 34B sides.

In this way, in the aerodynamic structure 10 for a vehicle relating to the embodiment, because the concave portions 20 suppress flowing-in of air into the wheel house 14, the airflow F that attempts to flow into the wheel house 14 from beneath the floor of the automobile S is weak, and disturbance of the airflow at the periphery of the wheel house 14 is prevented (is adjusted). Concretely, as shown in FIG. 4A, airflow Ff beneath the floor is prevented from being disturbed, and the smooth airflow Ff is obtained beneath the floor.

Further, the amount of air that flows into the wheel house 14 decreases, and the amount of air that is discharged from the side of the wheel house 14 also decreases. For these reasons, at the automobile S, airflow Fs along the side surface is prevented from being disturbed, and the smooth airflow Fs is obtained at the side surface.

Due to the above, at the automobile S to which the aerodynamic structure 10 for a vehicle is applied, a reduction in air resistance (the CD value), an improvement in driving stability, a reduction in wind noise, a reduction in splashing (water being scattered-up from the road surface by the front wheel 15, the rear wheel 16), and the like can be aimed for due to the operation of the concave portions 20.

Further, at the aerodynamic structure 10 for a vehicle, because the guide grooves 34 are provided forward of the concave portions 20, the airflows at the inner side and at the side of the wheel house 14 are adjusted. Concretely, because the airflow F within the wheel house 14 flows along (parallel to) the direction of rotation of the front wheel 15, the rear wheel 16 due to the guide grooves 34, disturbance of the airflow within the wheel house 14 (the application of air force to the front wheel 15, the rear wheel 16) is prevented. Further, because discharging of air that has gone via the side of the wheel house 14, i.e., the wheel arch 12A, 36A, is suppressed, the smooth airflow Fs is obtained at the automobile S.

Therefore, at the automobile S to which the aerodynamic structure 10 for a vehicle is applied, a reduction in air resistance, an improvement in the driving stability, a reduction in wind noise, a reduction in splashing, and the like can be aimed for also due to the operation of the guide grooves 34. Accordingly, at the automobile S in which the aerodynamic structures 10 for a vehicle are provided so as to correspond to the front wheels 15, the rear wheels 16 respectively, as shown in FIG. 4A, at both the front portion and the rear portion of the vehicle body, the smooth airflows Ff, Fs that do not have blowing-out that causes disturbance at the side surfaces and beneath the floor are obtained, and these flows merge smoothly at the rear of the vehicle body (refer to arrow Fj).

Figure 4B:
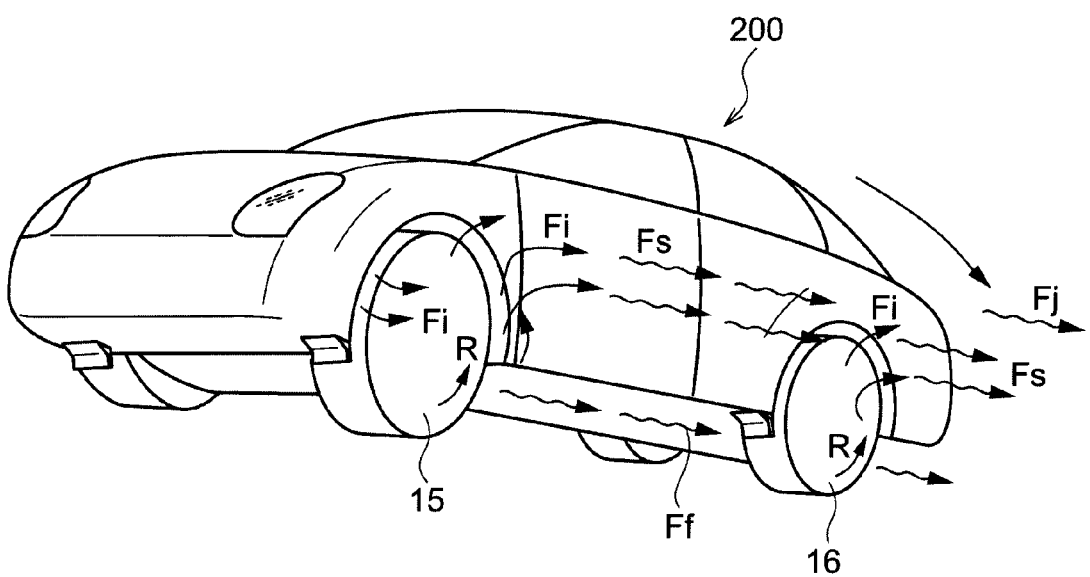
FIG. 4B is a perspective view of an automobile relating to a comparative example with the embodiment of the present invention.

To supplement explanation by comparison with a comparative example shown in FIG. 4B, at a comparative example 200 that is not provided with the aerodynamic structures 10 for a vehicle, the airflows F are generated within the wheel houses 14 accompanying the rotation of the front wheels 15, the rear wheels 16, and this flowing-in causes disturbance of the airflow Ff beneath the floor directly behind the front wheels 15, the rear wheels 16 (the portions where the airflows into the wheel houses 14 are generated). Further, the airflows F that have flowed into the wheel houses 14 go via the wheel arches 12A and are discharged out to the sides of the vehicle body (refer to arrows Fi), and cause disturbance of the airflows Fs. For these reasons, disturbance is caused as well in Fj that merges at the rear of the vehicle body.

In contrast, at the automobile S to which the aerodynamic structures 10 for a vehicle are applied, as described above, the flowing-in of air to the wheel houses 14 from the rear of the front wheels 15, the rear wheels 16 is suppressed by the concave portions 20, and the airflows that have flowed into the wheel houses 14 are adjusted at the guide grooves 34. Therefore, as described above, a reduction in air resistance, an improvement in the driving stability, a reduction in wind noise, a reduction in splashing, and the like can be realized.

In particular, at the aerodynamic structures 10 for a vehicle, because the plural concave portions 20 are provided continuously, the flowing-in of air to the wheel houses 14 from the rear of the front wheels 15, the rear wheels 16 can be suppressed even more effectively. Namely, a sufficient airflow adjusting effect can be obtained by a compact structure that suppresses the amount of projection of the concave portions 20 toward the vehicle body inner portion side. Further, because the guide grooves 34 do not communicate with the concave portions 20, air does not flow from the concave portions 20 to the guide grooves 34 and the pressure of the concave portions 20 does not decrease, and the effect of suppressing the flowing-in of the airflows F to the wheel houses 14 and the effect of adjusting the airflows F that have flowed into the wheel houses 14 can both be established effectively.

Further, at the aerodynamic structures 10 for a vehicle, because the concave portions 20 and the guide grooves 34 are positioned so as to be concave with respect to the general wall portion 28 of the fender liner 18, interference with the front wheel 15, the rear wheel 16 is not a problem. Accordingly, he concave portions 20, the guide grooves 34 can be designed on the basis of performances required from the standpoint of aerodynamics, without the dimensions and shapes or the arrangement and the like thereof being limited for preventing interference with the front wheel 15, the rear wheel 16.

By the way, at the aerodynamic structure 10 for a vehicle, there are cases in which adhered matter (hereinafter called ice/snow H) such as snow or ice or the like adheres between the fender liner 18, that forms the inner surface of the wheel house 14, and the front wheel 15 and the rear wheel 16.

Here, at the aerodynamic structure 10 for a vehicle, because the airflow guiding walls 22 that structure the concave portions 20 either extend along the vertical straight line VL or extend at a forwardly-tilting posture with respect to the vertical straight line VL, the airflow guiding walls 22 do not form negative angles with respect to the vertical (vehicle body vertical) direction at the inner surface side of the wheel house 14. Namely, at the aerodynamic structure 10 for a vehicle, an upwardly-directed surface that receives the ice/snow H is not formed at the inner surface of the wheel house 14, and the ice/snow H easily drops-down.

For example, in an aerodynamic structure 100 for a vehicle relating to a comparative example shown in FIG. 6A, although aerodynamic effects that are similar to the aerodynamic structure 10 for a vehicle can be obtained, airflow guiding walls 102, that hang-down from the rear end portions 24A in the vehicle body longitudinal direction of the airflow collision walls 24, form negative angles. Therefore, at the aerodynamic structure 100 for a vehicle, the ice/snow H that has adhered and accumulated catches on airflow guiding walls 102, that are directed upwardly in the vehicle body vertical direction and toward the front wheel 15 side, and it is difficult for the ice/snow H to drop-down.

In contrast, at the aerodynamic structure 10 for a vehicle, as described above, the airflow guiding walls 22 do not form negative angles, or in other words, there are no portions on which the ice/snow H catches, and therefore, the ice/snow H easily drops-down. Namely, at the aerodynamic structure 10 for a vehicle, while the requisite aerodynamic performances are ensured, the ability to discharge the ice/snow H improves as compared with the aerodynamic structure 100 for a vehicle.

Further, at the aerodynamic structure 10 for a vehicle, because negative angles are not formed with respect to the vertical direction as described above, by making the die cutting direction at the time of molding coincide with that direction, the fender liner 18 can be formed by using a simple mold structure (die structure) that does not have an undercut portion. Due thereto, the fender liner 18 that structures the aerodynamic structure 10 for a vehicle can be manufactured inexpensively without being made to be a divided structure or without using a slide die for forming an integral structure as in the case of a fender liner 104 that structures the aerodynamic structure 100 for a vehicle.

Moreover, at the aerodynamic structure 10 for a vehicle, the lower side concave portion 20 is positioned upward with respect to the aforementioned horizontal line HL on the whole, or, from another viewpoint, the respective airflow collision walls 24 are positioned upward with respect to the horizontal line HL that passes through the rotation axis RC of the front wheel 15, the rear wheel 16 in the standard traveling state, and the distance L from the airflow collision wall 24 to the surface of the front wheel 15, the rear wheel 16 is long. Therefore, the steering feeling being affected by the operation of blocking the airflow F due to the airflow collision walls 24, is suppressed.

For example, as shown in FIG. 6B, in the aerodynamic structure 100 for a vehicle relating to the comparative example, the airflow collision wall 24 is positioned near the horizontal line HL that passes through the rotation axis RC of the front wheel 15, the rear wheel 16 in the standard traveling state, or in other words, the airflow guiding wall 102 extends over the horizontal line HL. Therefore, the distance L along the vehicle body longitudinal direction from the airflow collision wall 24 to the front wheel 15 and the rear wheel 16 is short (substantially equal to the shortest distance L0 along the vehicle body longitudinal direction between the fender liner 18 and the front wheel 15). Therefore, airflow Fv, that is generated and disturbed accompanying the blocking of the airflow F at the airflow collision walls 24, applies air force to the surface of the front wheel 15, the rear wheel 16 (pushes the front wheel 15, the rear wheel 16 forward). The air force applied to the front wheel 15, the rear wheel 16 in this way is transmitted via the steering device, the steering wheel to the driver, and it can be thought that the driver will be made to feel changes in the steering feeling.

In contrast, at the aerodynamic structure 10 for a vehicle, because the distance L along the vehicle body longitudinal direction from the airflow collision wall 24 to the front wheel 15, the rear wheel 16 is long, even if the airflow Fv that is disturbed at the airflow collision wall 24 is generated, the airflow Fv applying air force to the front wheel 15, the rear wheel 16 is suppressed. Further, at the aerodynamic structure 10 for a vehicle, the portion where pressure rises due to the airflow collision walls 24 and the airflow guiding walls is positioned only at the upper side in the vehicle body vertical direction with respect to the rotational center of the wheel. Therefore, in a case in which the airflow Fv reaches the front wheel 15 at the substantially shortest distance from the airflow collision wall 24, because the air force due to the airflow Fv is divided into a component of force that pushes the front wheel 15 and the rear wheel 16 forward and a component of force that pushes the front wheel 15 and the rear wheel 16 downward, the force pushing the front wheel 15 and the rear wheel 16 forward becomes small. Namely, the effect (the air force), that is applied to the front wheel 15, the rear wheel 16 accompanying the airflow adjustment within the wheel house 14, is small. Therefore, at the aerodynamic structure 10 for a vehicle, the driver being made to feel changes in the steering feeling is effectively suppressed. Further, the down force can be increased by the component of force that pushes the front wheel 15 and the rear wheel 16 downward as described above.

Note that the above-described embodiment shows an example in which two of the concave portions 20 are provided, but the present invention is not limited to the same and can be structured, for example, to have one or three or more concave portions 20 in accordance with the required aerodynamic performances and the like.

Further, the above-described embodiment shows an example in which the aerodynamic structure 10 for a vehicle has the guide grooves 34, but the present invention is not limited to the same and may be, for example, a structure that does not have the guide grooves 34.

Moreover, the above-described embodiment shows an example in which the concave portions 20 are disposed at a rear portion 14A of the wheel house 14, but the present invention is not limited to the same. Provided that the airflow guiding walls 22 are structures that do not form negative angles with respect to the vehicle body vertical direction, the concave portions 20 may be disposed at any portion at the rear side in the vehicle body longitudinal direction with respect to the rotation axis RC of the front wheel 15, the rear wheel 16.

Figure 5:
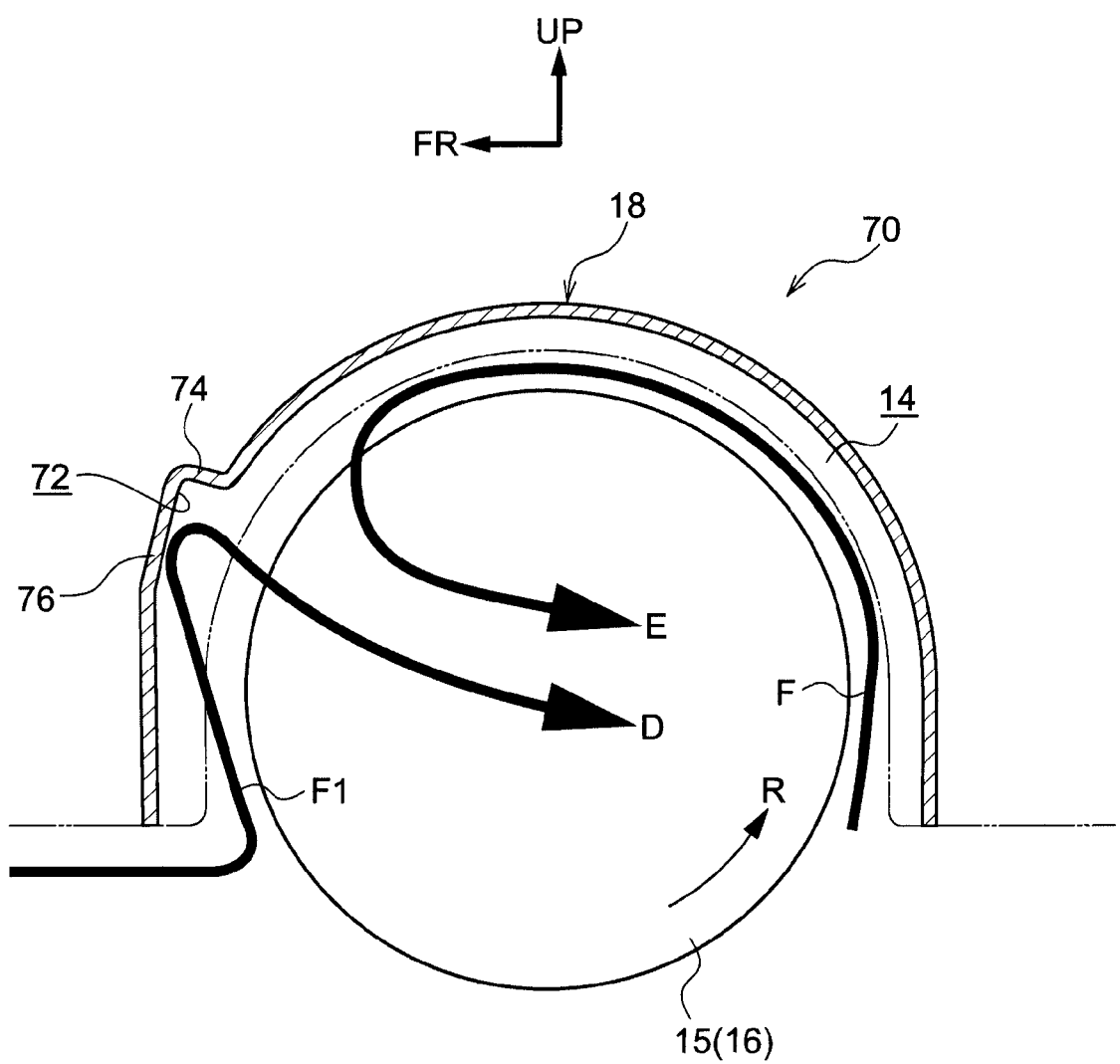
FIG. 5 is a side sectional view showing an aerodynamic structure for a vehicle relating to a modified example of the embodiment of the present invention.

Still further, the above-described embodiment shows an example in which the present invention is applied to the aerodynamic structure 10 for a vehicle in which the concave portions 20, that are for suppressing airflow F that is directed forward within the wheel house 14 accompanying the rotation of the front wheel 15 or the like, are formed at the rear side in the vehicle body longitudinal direction with respect to the rotation axis RC of the front wheel 15, the rear wheel 16. However, the present invention is not limited to the same. For example, as shown in FIG. 5, the present invention may be applied to an aerodynamic structure 70 for a vehicle in which a concave portion 72 is formed at the front side in the vehicle body longitudinal direction with respect to the rotational axis RC of the front wheel 15 or the like. To supplement description of the concave portion 72, the concave portion 72 has an airflow collision wall 74 that faces toward the lower side in the vehicle body vertical direction, and an airflow guiding wall 76 that hangs downwardly in the vehicle body vertical direction from the front edge in the vehicle body longitudinal direction of the airflow collision wall 74. In an automobile to which the aerodynamic structure 70 for a vehicle is applied, traveling wind hits the front surface of the front wheel 15 or the like, and airflow F1, that is directed from the front side toward the rear side of the front wheel 15 or the like within the wheel house 14, is generated, and, on the other hand, the airflow F, that accompanies rotation of the front wheel 15 or the like in the direction of arrow R, arises. A portion of the airflow F1 is guided by the airflow guiding wall 76 and flows-into the concave portion 72 and collides with the airflow collision wall 74, and therefore, a portion of the airflow F1 is blocked and the pressure within the concave portion 72 rises. Due thereto, at the aerodynamic structure 70 for a vehicle, the airflow F1, that cannot pass through the aforementioned portion where the pressure rises, is discharged from the wheel house 14 so as to flow at the side of the front wheel 15 or the like as shown by arrow D. On the other hand, when the airflow F reaches the portion where the pressure rises that is generated by the airflow F1 colliding with the airflow collision wall 74, the airflow F is discharged from the wheel house 14 so as to flow at the side of the front wheel 15 or the like as shown by arrow E. In this way, the power of both of the airflows F1, F is weakened and the airflows F1, F interfere due to the portion where the pressure rises, that is generated by the airflow F1 colliding with the airflow collision wall 74, and therefore, the airflows F1, F are smoothly discharged from the side of the front wheel 15 or the like. Namely, due to the aerodynamic structure 70 for a vehicle as well, the airflows at the inner side and at the side of the wheel house 14 are adjusted. By structuring the above-described concave portions 72 by the airflow guiding walls 76 and the airflow collision walls 74 that do not form negative angles in the vehicle body vertical direction, effects that are similar to the aerodynamic structure 10 for a vehicle, such as the ice/snow H that has adhered and accumulated at the front side of the front wheel 15 or the like is easily discharged, and the fender liner 18 can be manufactured at a low cost, and the like, can be obtained. Further, by providing the concave portions 72 further toward the upper side in the vehicle body vertical direction than the rotation axis RC of the front wheel 15 or the like, effects on the steering feeling can be suppressed. Note that the aerodynamic structure 70 for a vehicle also not being limited by the number of the concave portions 72 and the like is similar to the aerodynamic structure 10 for a vehicle.

The invention claimed is:

1. An aerodynamic structure for a vehicle, comprising:
   an airflow collision wall provided at a front or a rear in a vehicle body longitudinal direction with respect to a wheel in a wheel house, and extending in a vehicle width direction and facing downward in a vehicle body vertical direction; and
   an airflow guiding wall extending downward in the vehicle body vertical direction from a first end portion of the airflow collision wall, wherein the first end portion is at a side that is far from the wheel,
   wherein the airflow guiding wall extends so as to be directed both toward a wheel side and downward in the vehicle body vertical direction, and a distance that runs along the vehicle body longitudinal direction from a second end portion in the vehicle body longitudinal direction of the airflow collision wall to a surface of the wheel, is disposed so as to be long as compared with a shortest distance that runs along the vehicle body longitudinal direction between the airflow guiding wall and the wheel, wherein the second end portion is at a side that is close to the wheel.

2. The aerodynamic structure for a vehicle of claim 1, wherein the airflow collision wall and the airflow guiding wall are formed at a covering member that is formed in an arc shape that, from a side view, opens downward in the vehicle body vertical direction, and wherein the covering member covers the wheel from an upper side in the vehicle body vertical direction.

3. The aerodynamic structure for a vehicle of claim 1, wherein the airflow collision wall and the airflow guiding wall are disposed at an upper side in the vehicle body vertical direction with respect to a rotational center of the wheel.

* * * * *